(12) United States Patent
Jeong et al.

(10) Patent No.: US 12,308,500 B2
(45) Date of Patent: May 20, 2025

(54) FUEL CELL SYSTEM

(71) Applicants: HYUNDAI MOTOR COMPANY, Seoul (KR); KIA CORPORATION, Seoul (KR)

(72) Inventors: Pu Reum Jeong, Suncheon-si (KR); Hyo Sub Shim, Suwon-si (KR); In Tae Park, Yongin-si (KR); Dong Yeon Kim, Daejeon (KR); Sung Jin You, Gimpo-si (KR); Hyeon Seok Ban, Yongin-si (KR); Hak Yoon Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 677 days.

(21) Appl. No.: 17/667,333

(22) Filed: Feb. 8, 2022

(65) Prior Publication Data

US 2023/0047763 A1    Feb. 16, 2023

(30) Foreign Application Priority Data

Aug. 11, 2021 (KR) ........................ 10-2021-0106303

(51) Int. Cl.
  *H01M 8/2484* (2016.01)
  *H01M 8/04082* (2016.01)
  *H01M 8/04089* (2016.01)
  *H01M 8/04746* (2016.01)

(52) U.S. Cl.
  CPC ..... *H01M 8/2484* (2016.02); *H01M 8/04089* (2013.01); *H01M 8/04201* (2013.01); *H01M 8/04753* (2013.01); *H01M 2250/20* (2013.01)

(58) Field of Classification Search
  CPC .......... H01M 8/2484; H01M 8/04089; H01M 8/04201; H01M 8/04753; H01M 2250/20
  USPC ......................................................... 429/513
  See application file for complete search history.

(56) References Cited

U.S. PATENT DOCUMENTS

| | | | |
|---|---|---|---|
| 8,113,791 B2 | 2/2012 | Park et al. | |
| 9,368,806 B2 | 6/2016 | Noh et al. | |
| 2006/0234093 A1* | 10/2006 | Schaefer ........... | H01M 8/04201 |
| | | | 429/444 |
| 2009/0155102 A1 | 6/2009 | Park et al. | |

(Continued)

FOREIGN PATENT DOCUMENTS

| | | |
|---|---|---|
| KR | 100962903 B1 | 6/2010 |
| KR | 101405649 B1 | 6/2014 |
| KR | 20150131670 A | 11/2015 |

*Primary Examiner* — James M Erwin
(74) *Attorney, Agent, or Firm* — Lempia Summerfield Katz LLC

(57) ABSTRACT

A fuel cell system includes: a supply flow path configured to supply reactant gas; a first branch flow path branching off from an outlet end of the supply flow path and configured to guide the reactant gas to a first fuel cell stack; a second branch flow path branching off from the outlet end of the supply flow path and configured to communicate with the first branch flow path and guide the reactant gas to a second fuel cell stack; and an inlet area change part disposed in a boundary zone between the first branch flow path and the second branch flow path and configured to selectively change inlet areas of the first and second branch flow paths. Efficiency in discharging condensate water is increased and performance and operational efficiency are improved.

16 Claims, 26 Drawing Sheets

(56) References Cited

U.S. PATENT DOCUMENTS

| | | | | |
|---|---|---|---|---|
| 2010/0021783 A1* | 1/2010 | Osada | ............... | H01M 8/04225 |
| | | | | 429/424 |
| 2015/0244007 A1* | 8/2015 | Nakamoto | ........ | H01M 8/04395 |
| | | | | 429/446 |
| 2015/0288015 A1* | 10/2015 | Schade | ................. | H01M 8/249 |
| | | | | 429/444 |
| 2015/0333339 A1 | 11/2015 | Noh et al. | | |
| 2017/0077532 A1* | 3/2017 | Noh | .................. | H01M 8/04604 |
| 2020/0185743 A1* | 6/2020 | Bae | ................... | H01M 8/04388 |

* cited by examiner

FUEL CELL SYSTEM

CROSS-REFERENCE TO RELATED APPLICATION

This application claims priority to and the benefit of Korean Patent Application No. 10-2021-0106303 filed in the Korean Intellectual Property Office on Aug. 11, 2021, the entire contents of which are incorporated herein by reference.

TECHNICAL FIELD

The present disclosure relates to a fuel cell system, and more particularly, to a fuel cell system capable of increasing efficiency in discharging condensate water and improving performance and operational efficiency.

BACKGROUND ART

A fuel cell stack refers to a kind of power generation device that generates electrical energy through a chemical reaction of fuel (e.g., hydrogen). The fuel cell stack may be configured by stacking several tens or hundreds of fuel cells (unit cells) in series.

The fuel cell may include a membrane electrode assembly (MEA) having an electrolyte membrane that allows hydrogen positive ions to move therethrough and having electrodes (catalyst electrode layers) provided on two opposite surfaces of the electrolyte membrane to enable a reaction between hydrogen and oxygen. The fuel cell may also include gas diffusion layers (GDLs) disposed to be in close contact with two opposite surfaces of the membrane electrode assembly and configured to distribute reactant gases and transfer the generated electrical energy. The fuel cell may also include separators (bipolar plates) disposed to be in close contact with the gas diffusion layers and configured to define flow paths.

In addition, a pair of endplates is provided and connected by means of a band (strap) at two opposite ends of the plurality of fuel cells constituting the fuel cell stack. The fuel cells may be supported by the endplates to maintain surface pressures thereof (a friction contact state may be maintained).

Meanwhile, when the reactant gas (e.g., hydrogen) containing droplets is consistently supplied to the fuel cell stack, flooding occurs in the fuel cell stack, which causes deteriorations in performance and operational efficiency of the fuel cell stack. Further, in the winter season, there is a problem in that the condensate water supplied into the fuel cell stack is frozen.

Therefore, to prevent the flooding and stabilize the performance of the fuel cell stack, it is necessary to effectively discharge condensate water produced in the fuel cell stack (e.g., condensate water produced between the gas diffusion layers and channels of the separators).

In the related art, a technique has been proposed for increasing a supply flow rate of the reactant gas to be supplied to the fuel cell stack in order to remove condensate water produced in the fuel cell stack.

However, in the related art, a separate blower (or pump) or a separate ejector needs to be mounted to increase the supply flow rate of the reactant gas. This complicates a structure and a manufacturing process and increases manufacturing costs.

In particular, in the related art, a separate space for mounting the blower needs to be provided, which causes deteriorations in spatial utilization and degree of design freedom. Further, there is a problem in that the operation of the blower causes electric power consumption.

Therefore, recently, various studies have been conducted to ensure (i.e., improve) performance in discharging condensate water, simplify a structure and a manufacturing process, and reduce costs, but the study results are still insufficient. Accordingly, there is a need to develop a technology to ensure (i.e., improve) performance in discharging condensate water, simplify a structure and a manufacturing process, and reduce costs.

SUMMARY

The present disclosure has been made in an effort to provide a fuel cell system capable of increasing efficiency in discharging condensate water and improving performance and operational efficiency.

In particular, the present disclosure has been made in an effort to effectively discharge condensate water without a separate blower for discharging the condensate water.

The present disclosure has also been made in an effort to inhibit flooding in a fuel cell stack and improve stability and reliability.

The present disclosure has also been made in an effort to simplify a structure and improve a degree of design freedom and spatial utilization.

The present disclosure has also been made in an effort to reduce costs and minimize electric power consumption.

The objects to be achieved by the embodiments of the present disclosure are not limited to the above-mentioned objects, but also include objects or effects that may be understood from the solutions or embodiments described below.

An embodiment of the present disclosure provides a fuel cell system including: a supply flow path configured to supply reactant gas; a first branch flow path branching off from an outlet end of the supply flow path and configured to guide the reactant gas to a first fuel cell stack; a second branch flow path branching off from the outlet end of the supply flow path and configured to communicate with the first branch flow path and guide the reactant gas to a second fuel cell stack; and an inlet area change part disposed in a boundary zone between the first branch flow path and the second branch flow path and configured to selectively change inlet areas of the first and second branch flow paths.

This is to increase efficiency in discharging condensate water in the fuel cell stack and improve performance and operational efficiency.

To prevent the flooding and stabilize the performance of the fuel cell stack, it is necessary to effectively discharge condensate water produced in the fuel cell stack (e.g., condensate water produced between the gas diffusion layers and channels of the separators).

In the related art, to remove the condensate water produced in the fuel cell stack, a separate blower (or pump) or a separate ejector needs to be mounted to increase a supply flow rate of the reactant gas to be supplied to the fuel cell stack. The separate blower complicates a structure and a manufacturing process and increases manufacturing costs. In particular, in the related art, a separate space for mounting the blower needs to be provided, which causes deterioration in spatial utilization and degree of design freedom. Further, there is a problem in that the operation of the blower causes electric power consumption.

However, according to an embodiment of the present disclosure, the inlet areas of the first and second branch flow paths are changed by the inlet area change part. The inlet areas are changed when the reactant gas (e.g., hydrogen) supplied along the supply flow path is divided into the first branch flow path and the second branch flow path. Thus, the supply flow rate of the reactant gas to be supplied to the first and second branch flow paths may be changed. Therefore, it is possible to obtain an advantageous effect of effectively discharging condensate water in the fuel cell stack.

Among other things, according to an embodiment of the present disclosure, it is possible to increase the maximum supply flow rate of the reactant gas to be supplied to the first and second branch flow paths by changing the inlet areas of the first and second branch flow paths. Therefore, it is possible to implement an effect similar to the effect of increasing a stoichiometric ratio (SR) of the reactant gas.

This is based on the fact that as the stoichiometric ratio (SR) of the reactant gas increases, the recirculation performance of the reactant gas is improved, and the total supply amount of reactant gas increases, which improves the performance in discharging the condensate water. According to an embodiment of the present disclosure, it is possible to implement an effect similar to the effect of increasing the stoichiometric ratio (SR) of the reactant gas by temporarily (periodically) increasing the supply flow rate (maximum supply flow rate) of the reactant gas to be supplied to the first and second fuel cell stacks by changing the inlet areas of the first and second branch flow paths. Therefore, it is possible to obtain an advantageous effect of increasing efficiency in discharging condensate water and improving performance and operational efficiency without a separate blower.

For reference, in embodiments of the present disclosure, the stoichiometric ratio (SR) is defined as a value made by dividing the total supply amount of reactant gas (e.g., the supply amount of hydrogen+the amount of recirculating hydrogen) by the consumption amount of reactant gas (the target supply amount of hydrogen) (i.e., a value made by dividing the amount of actually supplied hydrogen by the amount of theoretically required hydrogen).

The inlet area change part may have various structures capable of selectively changing the inlet areas of the first and second branch flow paths.

More specifically, the inlet area change part may selectively increase and decrease a first inlet area of the first branch flow path and a second inlet area of the second branch flow path. A first supply flow rate of the reactant gas to be supplied to the first branch flow path may be changed as the inlet area change part increases or decreases the first inlet area. A second supply flow rate of the reactant gas to be supplied to the second branch flow path may be changed as the inlet area change part increases or decreases the second inlet area of the second branch flow path.

According to an embodiment of the present disclosure, the inlet area change part is configured such that the first inlet area and the second inlet area are increased and decreased in conjunction with each other.

For example, by the inlet area change part, the second inlet area may decrease in conjunction with the increase in first inlet area, and the second inlet area may increase in conjunction with the decrease in first inlet area.

Since the first inlet area and the second inlet area are increased and decreased in conjunction with each other as described above, the first and second inlet areas may be simultaneously changed by the single inlet area change part. Therefore, it is possible to obtain an advantageous effect of simplifying the structure of the inlet area change part.

The inlet area change part may have various structures capable of simultaneously increasing and decreasing the first and second inlet areas.

For example, the inlet area change part may include: a shaft part rotatably disposed on a centerline defined in the boundary zone; a rotary member disposed to be rotatable about the shaft part and comprising a first blade part connected to the shaft part and having a first contact surface that comes into contact with the reactant gas in a first zone defined based on the centerline, and a second blade part connected to the shaft part and having a second contact surface that comes into contact with the reactant gas in a second zone based on the centerline; and a counterweight disposed on the shaft part and configured to apply a load to the rotary member so that the rotary member moves to a position at which the first blade part and the second blade part are balanced based on the centerline.

According to an embodiment of the present disclosure, the fuel cell system may include a mount part disposed on a boundary wall that defines a wall surface of the boundary zone, and the shaft part may be rotatably supported on the mount part.

According to an embodiment of the present disclosure, the first and second contact surfaces may each have any one of a straight shape, a curved shape, and a combination of the straight shape and the curved shape.

In particular, the first and second contact surfaces may be symmetric with respect to the centerline.

Since the first contact surface and the second contact surface are symmetric with respect to the centerline as described above, it is possible to obtain an advantageous effect of uniformizing a rotation period and a rotational speed (a clockwise rotational speed and a counterclockwise rotational speed) of the rotary member when the rotary member rotates clockwise and counterclockwise.

According to an embodiment of the present disclosure, the fuel cell system may include a sliding coupling part disposed on the shaft part and configured to allow the counterweight to be slidably coupled thereto.

According to an embodiment of the present disclosure, the counterweight may be partially provided in a partial section in an axial direction of the shaft part. Alternatively, the counterweight may be continuously provided in an entire section in an axial direction of the shaft part.

According to an embodiment of the present disclosure, the fuel cell system may include a connection member having one end connected to the first blade part and the other end connected to the second blade part.

Since the first blade part and the second blade part are connected by means of the connection member as described above, it is possible to obtain an advantageous effect of ensuring structural rigidity of the rotary member and further increasing the reciprocating rotation period of the rotary member.

The connection member may have various structures capable of connecting the first blade part and the second blade part.

For example, one end and the other end of the connection member may be connected to be spaced apart from outermost peripheral ends of the first and second blade parts.

As another example, one end of the connection member may be connected to the first blade part, the other end of the connection member may be connected to the second blade part, and one end and the other end of the connection member may be connected to the outermost peripheral ends of the first and second blade parts.

According to an embodiment of the present disclosure, the fuel cell system may include: a first extension portion bent and extending from an end of the first blade part; and a second extension portion bent and extending from an end of the second blade part.

Since the first and second extension portions are provided as described above, it is possible to ensure a sufficient contact area with which the reactant gas comes into contact. Therefore, it is possible to obtain an advantageous effect of further increasing the rotational forces (the clockwise rotational force and the counterclockwise rotational force) applied to the rotary member.

According to an embodiment of the present disclosure, the fuel cell system may include a stopper part configured to restrict a rotation section of the rotary member.

The stopper part may have various structures capable of restricting the rotation section of the rotary member.

For example, the stopper part may include a first stopper member disposed between the first blade part and the second blade part and provided on a boundary wall that defines a wall surface of the boundary zone between the first and second branch flow paths.

As described above, the first stopper member is provided between the first blade part and the second blade part. The first stopper member is restricted by the inner surface of the first blade part or the second blade part when the rotary member rotates to a predetermined extent or more (clockwise and counterclockwise). Therefore, it is possible to inhibit the rotary member from excessively rotating and to inhibit the reciprocating rotation period of the rotary member from increasing to a predetermined extent or more.

In particular, to improve durability of the stopper part, the rotary member may not come into contact with (collide with) the stopper part under a normal operating condition of the rotary member (a condition in which the rotary member rotates in a preset normal rotation range). However, the rotary member may come into contact with the stopper part only when the rotary member rotates out of the preset normal rotation range.

As another example, the stopper part may include a second stopper member disposed between the first blade part and the second blade part and provided on a wall surface of the supply flow path.

According to an embodiment of the present disclosure described above, it is possible to obtain an advantageous effect of increasing efficiency in discharging condensate water and improving performance and operational efficiency.

In particular, according to an embodiment of the present disclosure, it is possible to obtain an advantageous effect of effectively discharging condensate water by selectively changing the supply flow rate of the reactant gas without a separate blower for discharging the condensate water.

In addition, according to an embodiment of the present disclosure, it is possible to obtain an advantageous effect of using a wider output section as an available range by easily satisfying the stoichiometric ratio (SR) of the reactant gas required for each output section.

In addition, according to an embodiment of the present disclosure, it is possible to obtain an advantageous effect of inhibiting flooding in the fuel cell stack and minimizing deterioration in performance and operational efficiency caused by the flooding.

In addition, according to an embodiment of the present disclosure, it is possible to obtain an advantageous effect of simplifying the structure and improving the degree of design freedom and the spatial utilization.

In addition, according to an embodiment of the present disclosure, it is possible to obtain an advantageous effect of reducing costs and minimizing electric power consumption.

In addition, according to an embodiment of the present disclosure, it is possible to obtain an advantageous effect of improving stability and reliability.

DETAILED DESCRIPTION

Figure 1:
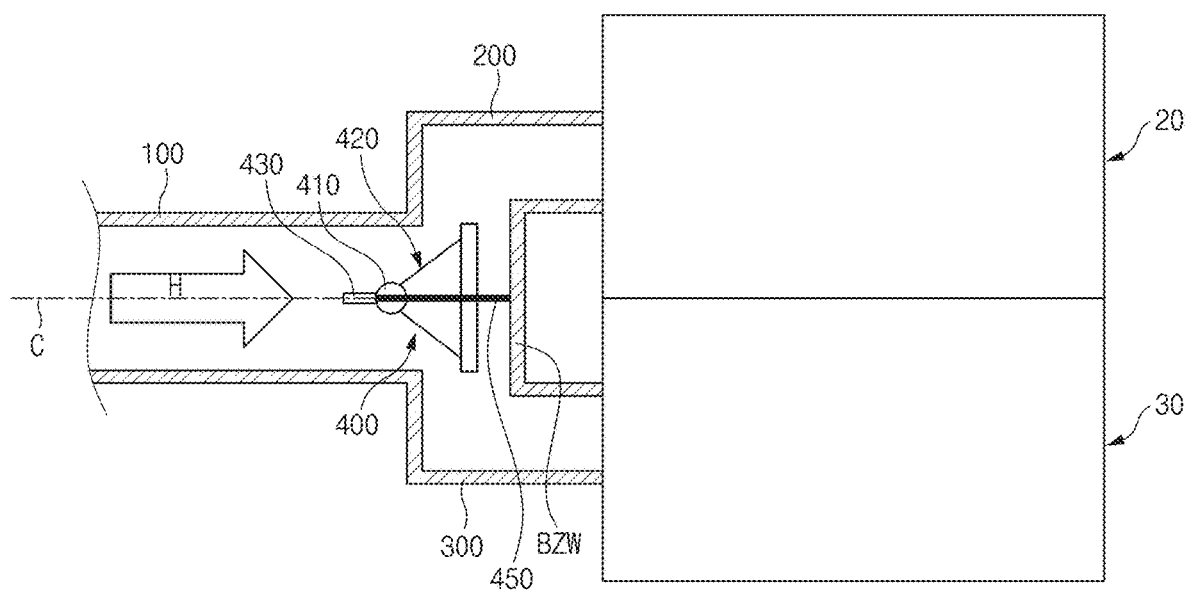
FIG. 1 is a view for explaining a fuel cell system according to an embodiment of the present disclosure.

Hereinafter, embodiments of the present disclosure are described in detail with reference to the accompanying drawings.

However, the technical spirit of the present disclosure is not limited to the embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as having meanings which may be commonly understood by a person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C and may include any one of A, B, or C or any combination of two of A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1-26, a fuel cell system 10 according to an embodiment of the present disclosure includes: a supply flow path 100 configured to supply a reactant gas; a first branch flow path 200 branching off from an outlet end of the supply flow path 100 and configured to guide the reactant gas to a first fuel cell stack 20; a second branch flow path 300 branching off from the outlet end of the supply flow path 100 and configured to communicate with the first branch flow path 200 and guide the reactant gas to a second fuel cell stack 30; and an inlet area change part 400 disposed in a boundary zone BZ between the first branch flow path 200 and the second branch flow path 300 and configured to selectively change an inlet area of the first branch flow path 200 and an inlet area of the second branch flow path 300.

For reference, the fuel cell system 10 according to the embodiment of the present disclosure may be applied to various fuel cell vehicles (e.g., passenger vehicles or commercial vehicles), ships, mobility vehicles in aerospace field, or the like to which the fuel cell stacks (e.g., the first fuel cell stack and the second fuel cell stack) may be applied. The present disclosure is not restricted or limited by the type and properties of a subject to which the fuel cell system 10 is applied.

According to an embodiment of the present disclosure, the first and second fuel cell stacks 20 and 30, which constitute the fuel cell system 10, may be stacked in a vertical direction (upward/downward direction). According to another embodiment of the present disclosure, the fuel cell system 10 may include three or more fuel cell stacks. Alternatively, the plurality of fuel cell stacks may be arranged in a horizontal direction or other directions.

Hereinafter, an example is described in which the first fuel cell stack 20 is stacked on an upper portion of the second fuel cell stack 30.

The first and second fuel cell stacks 20 and 30 each refer to a kind of power generation device that generates electrical energy through a chemical reaction of fuel (e.g., hydrogen). The fuel cell stack may be configured by stacking several tens or hundreds of fuel cells (unit cells) (not illustrated) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which is attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction producing water. As a result of the movement of the hydrogen ions, the electrons flow through external conductive wires, and the electric current is generated as a result of the flow of the electrons.

In addition, manifold flow paths (e.g., a hydrogen manifold, a coolant manifold, and an air manifold) (not illustrated) for moving (supplying and discharging) hydrogen, air, and a coolant are penetratively provided in the fuel cell of each of the first and second fuel cell stacks 20 and 30.

The manifold flow path may be variously changed in structure and shape in accordance with required conditions and design specifications. The present disclosure is not restricted or limited by the structure and shape of the manifold flow path.

For example, the manifold flow path, through which the hydrogen flows, may include a hydrogen inlet manifold (not illustrated) through which the hydrogen is supplied, and may include a hydrogen outlet manifold (not illustrated) through which the hydrogen is discharged.

Referring to FIGS. 1-5, the supply flow path 100, the first branch flow path 200, and the second branch flow path 300 are provided to supply the reactant gas (e.g., hydrogen) to the first and second fuel cell stacks 20 and 30.

A reactant gas supply system (e.g., a hydrogen supply system) may be connected to one end of the supply flow path 100. The reactant gas supplied from the reactant gas supply system may be supplied to the first and second fuel cell stacks 20 and 30 through the supply flow path 100, the first branch flow path 200, and the second branch flow path 300.

The supply flow path 100 may have various structures capable of supplying the reactant gas. The present disclosure is not restricted or limited by the structure of the supply flow path 100.

For example, the supply flow path 100 may have a straight shape. Alternatively, the supply flow path 100 may have a curved shape or other shapes.

The first branch flow path 200 branches off from the outlet end of the supply flow path 100 and guides the reactant gas to the first fuel cell stack 20.

For example, one end of the first branch flow path 200 may be connected to (may branch off from) the outlet end of the supply flow path 100 at an angle of about 90 degrees.

The other end of the first branch flow path 200 may be connected to the manifold flow path of the first fuel cell stack 20.

The first branch flow path 200 may have various structures capable of connecting the supply flow path 100 and the first fuel cell stack 20. The present disclosure is not restricted or limited by the structure and shape of the first branch flow path 200. For example, the first branch flow path 200 may have an approximately "L" shape.

The second branch flow path 300 branches off from the outlet end of the supply flow path 100, communicates with the first branch flow path 200, and guides the reactant gas to the second fuel cell stack 30.

For example, one end of the second branch flow path 300 may be connected to (may branch off from) the outlet end of the supply flow path 100 at an angle of about 90 degrees. The other end of the second branch flow path 300 may be connected to the manifold flow path of the second fuel cell stack 30.

For example, the first branch flow path 200, the second branch flow path 300, and the supply flow path 100 may cooperatively define an approximately "T" shape. According to another embodiment of the present disclosure, the first branch flow path 200, the second branch flow path 300, and the supply flow path 100 may be connected to cooperatively define an approximately "Y" shape or other shapes.

The second branch flow path 300 may have various structures capable of connecting the supply flow path 100 and the second fuel cell stack 30. The present disclosure is not restricted or limited by the structure and shape of the second branch flow path 300. For example, the second branch flow path 300 may have an approximately "L" shape.

In an embodiment of the present disclosure illustrated and described above, the example has been described in which the first and second branch flow paths 200 and 300 are symmetrically disposed based on the supply flow path 100 (e.g., based on a centerline defined in the boundary zone between the first branch flow path and the second branch flow path). However, according to another embodiment of the present disclosure, the first and second branch flow paths 200 and 300 may be asymmetrically disposed (e.g., may have different sizes or shapes) based on the supply flow path 100.

Referring to FIGS. 1-5, the inlet area change part 400 is disposed in the boundary zone BZ between the first branch flow path 200 and the second branch flow path 300 and selectively changes the inlet areas of the first and second branch flow paths 200 and 300.

In other words, the inlet area change part 400 serves as a kind of valve for selectively changing the inlet areas of the first and second branch flow paths 200 and 300.

In this case, the inlet areas of the first and second branch flow paths 200 and 300 may be understood as inlet end areas of the first and second branch flow paths 200 and 300 into which the reactant gas flowing from the outlet end of the supply flow path 100 is introduced (cross-sectional areas through which the reactant gas passes).

The inlet area change part 400 may have various structures capable of selectively changing the inlet areas of the first and second branch flow paths 200 and 300. The present disclosure is not restricted or limited by the structure and operational structure of the inlet area change part 400.

More specifically, the inlet area change part 400 may selectively increase and decrease a first inlet area of the first branch flow path 200 and a second inlet area of the second branch flow path 300. A first supply flow rate of the reactant gas to be supplied to the first branch flow path 200 may be changed as the inlet area change part 400 increases or decreases the first inlet area. A second supply flow rate of the reactant gas to be supplied to the second branch flow path 300 may be changed as the inlet area change part 400 increases or decreases the second inlet area of the second branch flow path 300.

According to an embodiment of the present disclosure, the inlet area change part 400 is configured such that the first inlet area and the second inlet area are increased and decreased in conjunction with each other.

In this case, the configuration in which the first inlet area and the second inlet area are increased and decreased in conjunction with each other may mean that the second inlet area increases or decreases in conjunction with the increase or decrease in first inlet area and may mean that the first inlet area increases or decreases in conjunction with the increase or decrease in second inlet area.

For example, by the inlet area change part 400, the second inlet area may decrease in conjunction with the increase in first inlet area, and the second inlet area may increase in conjunction with the decrease in first inlet area.

Since the first inlet area and the second inlet area are increased and decreased in conjunction with each other as described above, the first and second inlet areas may be simultaneously changed by the single inlet area change part 400. Therefore, it is possible to obtain an advantageous effect of simplifying the structure of the inlet area change part 400.

According to another embodiment of the present disclosure, the inlet area change parts 400 may respectively increase and decrease the first and second inlet areas. For example, the first inlet area may be selectively changed by a first inlet area change part 400 and the second inlet area may be selectively changed by a second inlet area change part 400 provided separately from the first inlet area change part 400.

The inlet area change part 400 may have various structures capable of simultaneously increasing and decreasing the first and second inlet areas.

For example, the inlet area change part 400 may include: a shaft part 410 rotatably disposed on a centerline C defined in the boundary zone BZ; a rotary member 420 disposed to be rotatable about the shaft part 410 and including a first blade part 422 connected to the shaft part 410 and having a first contact surface 422a that comes into contact with the reactant gas in a first zone Z1 defined based on the centerline C, and a second blade part 424 connected to the shaft part 410 and having a second contact surface 424a that comes into contact with the reactant gas in a second zone Z2 defined based on the centerline C; and a counterweight 430 disposed on the shaft part 410 and configured to apply a load to the rotary member 420 so that the rotary member 420 moves to a position at which the first blade part 422 and the second blade part 424 are balanced based on the centerline C.

The shaft part 410 is rotatably disposed on the centerline C defined in the boundary zone BZ between the first branch flow path 200 and the second branch flow path 300.

For example, the centerline C may be defined at the center of the boundary zone BZ (the center of the supply flow path 100), an upper region (based on FIG. 2) of the centerline C may be defined as the first zone Z1, and a lower region (based on FIG. 2) of the centerline C may be defined as the second zone Z2.

The shaft part 410 may have various structures capable of being rotated in the boundary zone BZ. The present disclosure is not restricted or limited by the structure and shape of the shaft part 410.

For example, the shaft part 410 may have a hollow cylindrical shape.

In particular, two opposite ends of the shaft part 410 may be rotatably supported by bearing members (not illustrated) to ensure a smooth rotation of the shaft part 410 and minimize the deformation and damage caused by friction.

According to an embodiment of the present disclosure, the fuel cell system 10 may include a mount part 450 disposed on a boundary wall BZW that defines a wall surface of the boundary zone BZ. The shaft part 410 may be rotatably supported on the mount part 450.

The mount part 450 may have various structures capable of supporting the shaft part 410 so that the shaft part 410 is rotatable. The present disclosure is not restricted or limited by the structure of the mount part 450.

For example, the mount part 450 may support two opposite ends of the shaft part 410.

For reference, the mount part 450 may be mounted directly on the boundary wall BZW or disposed in the boundary wall BZW in a state in which the mount part 450 is assembled with (coupled to) a separate member (not illustrated).

The rotary member 420 includes the first blade part 422 connected to the shaft part 410 and having the first contact surface 422a that comes into contact with the reactant gas in the first zone Z1 defined based on the centerline C, and includes the second blade part 424 connected to the shaft part 410 and having the second contact surface 424a that comes into contact with the reactant gas in the second zone Z2 defined based on the centerline C. The rotary member 420 simultaneously increases and decreases the first and second inlet areas while being reciprocatingly rotated about the shaft part 410 by a force of the moving reactant gas (rectilinear force).

The first blade part 422 is configured such that, when the reactant gas collides with (comes into contact with) the first blade part 422, the first blade part 422 provides a rotational force for rotating the rotary member 420 in one direction (e.g., clockwise) to increase or decrease the first inlet area.

The first blade part 422 may have various structures having the first contact surface 422a. The present disclosure is not restricted or limited by the structure of the first blade part 422.

For example, the first blade part 422 may be provided in the form of a flat plate. One end of the first blade part 422 may be connected to the shaft part 410 and the other end of the first blade part 422 may be disposed as a free end.

The first blade part 422 may be disposed to be inclined at a predetermined angle with respect to the centerline C. In this case, an inclination angle of the first blade part 422 (an angle at which the first blade part 422 is inclined with respect to the centerline) may be variously changed in accordance with required conditions and design specifications. The present disclosure is not restricted or limited by the inclination angle of the first blade part 422.

The first contact surface 422a is defined on an outer surface of the first blade part 422 in a direction intersecting the flow direction (rectilinear direction) of the reactant gas. Since the first contact surface 422a is provided on the outer surface of the first blade part 422 as described above, a rotational force (torque) in one direction (e.g., a clockwise direction) may be applied to the rotary member 420 when the reactant gas flowing along the first zone Z1 comes into contact with the first contact surface 422a.

The first contact surface 422a may have various structures capable of coming into contact with the reactant gas. The present disclosure is not restricted or limited by the structure and shape of the first contact surface 422a. For example, the first contact surface 422a may have any one of a straight shape, a curved shape (e.g., a circular arc shape or a continuous waveform), and a combination of the straight shape and the curved shape. Hereinafter, an example is described in which the first contact surface 422a has a straight shape.

The first inlet area may gradually increase as the first blade part 422 rotates clockwise about the shaft part 410. On the contrary, the first inlet area may gradually decrease as the first blade part 422 rotates counterclockwise about the shaft part 410.

The second blade part 424 is configured such that, when the reactant gas collides with (comes into contact with) the second blade part 424, the second blade part 424 provides a rotational force for rotating the rotary member 420 in the other direction (e.g., counterclockwise) to increase or decrease the second inlet area.

The second blade part 424 may have various structures having the second contact surface 424a. The present disclosure is not restricted or limited by the structure of the second blade part 424.

For example, the second blade part 424 may be provided in the form of a flat plate. One end of the second blade part 424 may be connected to the shaft part 410 and the other end of the second blade part 424 may be disposed as a free end.

The second blade part 424 may be disposed to be inclined at a predetermined angle with respect to the centerline C. In this case, an inclination angle of the second blade part 424 (an angle at which the second blade part 424 is inclined with respect to the centerline) may be variously changed in accordance with required conditions and design specifications. The present disclosure is not restricted or limited by the inclination angle of the second blade part 424.

The second contact surface 424a is defined on an outer surface of the second blade part 424 in a direction intersecting the flow direction (rectilinear direction) of the reactant gas. Since the second contact surface 424a is provided on the outer surface of the second blade part 424 as described above, a rotational force (torque) in the other direction (e.g., a counterclockwise direction) may be applied to the rotary member 420 when the reactant gas flowing along the second zone Z2 comes into contact with the second contact surface 424a.

The second contact surface 424a may have various structures capable of coming into contact with the reactant gas. The present disclosure is not restricted or limited by the structure and shape of the second contact surface 424a. For example, the second contact surface 424a may have any one of a straight shape, a curved shape (e.g., a circular arc shape or a continuous waveform), and a combination of the straight shape and the curved shape. Hereinafter, an example is described in which the second contact surface 424a has a straight shape.

The second inlet area may gradually decrease as the second blade part 424 rotates clockwise about the shaft part 410. On the contrary, the second inlet area may gradually increase as the second blade part 424 rotates counterclockwise about the shaft part 410.

In particular, the first contact surface 422a and the second contact surface 424a are symmetric (linearly symmetric) with respect to the centerline C.

For example, the first blade part 422 and the second blade part 424 may cooperatively define an isosceles triangular shape. The first contact surface 422*a* and the second contact surface 424*a* may be symmetric with respect to the centerline C.

Since the first contact surface 422*a* and the second contact surface 424*a* are symmetric with respect to the centerline C as described above, it is possible to obtain an advantageous effect of uniformizing a rotation period P and a rotational speed (a clockwise rotational speed and a counterclockwise rotational speed) of the rotary member 420 when the rotary member 420 rotates clockwise and counterclockwise.

According to another embodiment of the present disclosure, the first contact surface 422*a* and the second contact surface 424*a* may be asymmetric (e.g., may have different inclination angles or different shapes) with respect to the centerline C.

For reference, an angle between the first blade part 422 and the second blade part 424 may be determined in consideration of the reciprocating rotation period P of the rotary member 420 and a restoring force that restores the rotary member 420 to an initial state (the symmetric state in which the first blade part and the second blade part are balanced based on the centerline). For example, when the angle between the first blade part 422 and the second blade part 424 increases, the reciprocating rotation period P of the rotary member 420 may increase. However, the restoring force for restoring the rotary member 420 to the initial state may decrease.

The counterweight 430 (or a weight member) serves to apply a load to the rotary member 420 so that the rotary member 420 moves to the position (initial state) at which the first blade part 422 and the second blade part 424 are balanced based on the centerline C.

In this case, the configuration in which the counterweight 430 applies the load to the rotary member 420 so that the rotary member 420 moves to the position at which the first blade part 422 and the second blade part 424 are balanced based on the centerline C means that the counterweight 430 applies a rotational force opposite to a rotational force (clockwise rotational force) applied to the rotary member 420 by the weight of the rotary member 420 under a condition in which the reactant gas does not come into contact with the first blade part 422 and the second blade part 424.

In addition, the configuration in which the first blade part 422 and the second blade part 424 are balanced based on the centerline C may mean that a center of gravity of the rotary member 420, which is defined at the center of the first and second blade parts 422 and 424, is positioned on the centerline C.

The angle between the first blade part 422 and the second blade part 424 may be 30-120 degrees, more particularly, 45-90 degrees. When the angle between the first blade part 422 and the second blade part 424 is too large, the rotational forces applied to the rotary member 420 are greatly offset between the blade parts (the first blade part and the second blade part). In contrast, when the angle between the first blade part 422 and the second blade part 424 is too small, the rotational forces applied to the blade parts are too low, the rotation angle of the rotary member 420 decreases, and a deviation between the first inlet area and the second inlet area decreases. Thus, an effect of discharging water from the stack deteriorates.

Lengths in the flow direction of the first and second blade parts 422 and 424 need to be long enough for the rotary member 420 to cover 50% or more of a cross-sectional area of the first or second inlet area when the rotary member 420 is rotated. In contrast, when the lengths in the flow direction of the first and second blade parts 422 and 424 are too short, the deviation between the first inlet area and the second inlet area decreases, and thus the effect of discharging water from the stack deteriorates.

The counterweight 430 may have various structures capable of offsetting the rotational force applied to the rotary member 420 by the weight of the rotary member 420. The present disclosure is not restricted or limited by the structure and shape of the counterweight 430.

For example, the counterweight 430 may be provided in the form of a rectilinear quadrangular block and coupled to the shaft part 410 so as to protrude outward in a radial direction of the shaft part 410.

For reference, when a length of the counterweight 430 increases (or a weight of the counterweight 430 increases), the reciprocating rotation period P of the rotary member 420 may increase. However, the restoring force for restoring the rotary member 420 to the initial state (the symmetric state in which the first blade part and the second blade part are balanced based on the centerline) may decrease, and the counterweight 430 may cover the first inlet area and the second inlet area. Therefore, a weight, a size, and a structure of the counterweight 430 may be appropriately changed in consideration of a condition for supplying the reactant gas, a structure and a size of the rotary member 420, and the like.

Figure 23:
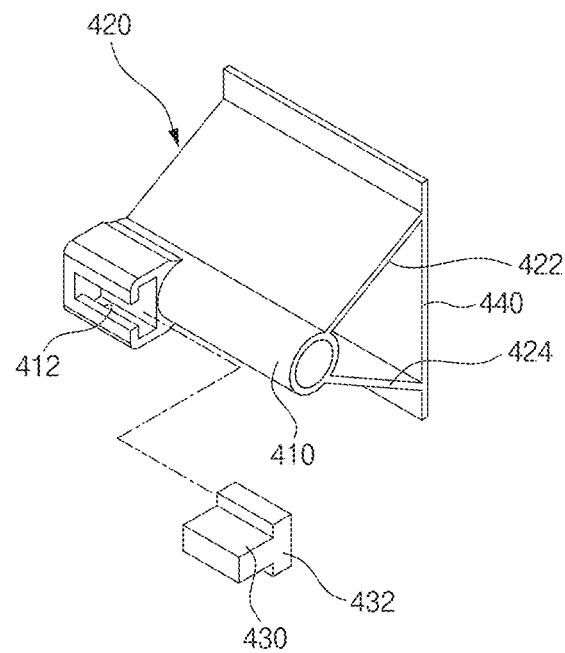
FIGS. 23 and 24 are views for explaining a counterweight of the fuel cell system according to an embodiment of the present disclosure.
Figure 24:
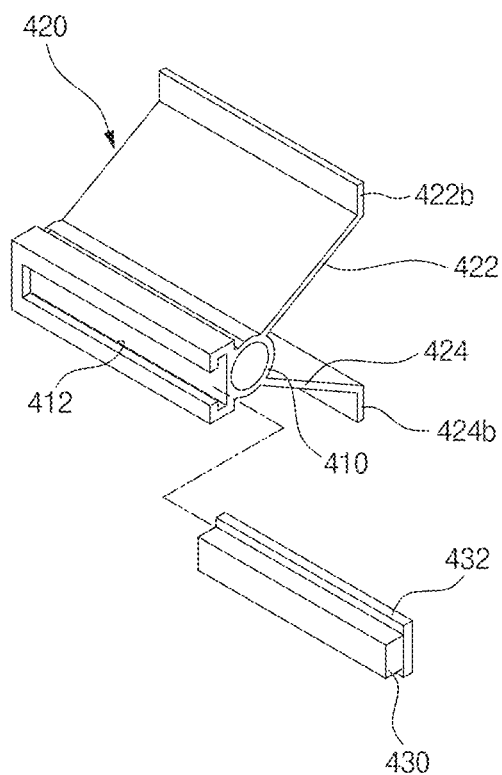

Referring to FIGS. 23-24, according to an embodiment of the present disclosure, the fuel cell system 10 may include a sliding coupling part 412 disposed on the shaft part 410 and configured to allow the counterweight 430 to be slidably coupled thereto.

In this case, the sliding coupling part 412 may be defined as a concept including all protrusions or grooves to which the counterweight 430 may be slidably coupled.

For example, the sliding coupling part 412 in the form of a groove (e.g., a quadrangular groove) may be provided on the shaft part 410 and disposed in an axis direction of the shaft part 410. The counterweight 430 may have a coupling protrusion 432 slidably coupled to the sliding coupling part 412.

In the embodiment of the present disclosure illustrated and described above, the example has been described in which the counterweight 430 protrudes outside the shaft part 410. However, according to another embodiment of the present disclosure, the counterweight 430 may be disposed in the shaft part 410.

Alternatively, the shaft part 410 and the counterweight 430 may be integrated by injection molding.

According to an embodiment of the present disclosure, the fuel cell system 10 may include a connection member 440 having one end connected to the first blade part 422 and the other end connected to the second blade part 424.

Since the first blade part 422 and the second blade part 424 are connected by means of the connection member 440 as described above, it is possible to obtain an advantageous effect of ensuring structural rigidity of the rotary member 420 and further increasing the reciprocating rotation period P of the rotary member 420.

The connection member 440 may have various structures capable of connecting the first blade part 422 and the second blade part 424. The present disclosure is not restricted or limited by the structure and shape of the connection member 440.

For example, the connection member 440 may have any one of a straight shape, a curved shape, and a combination of the straight shape and the curved shape. Hereinafter, an example is described in which the connection member 440 has a straight shape.

With this configuration, when the reactant gas is supplied along the supply flow path 100, the reactant gas collides with the first contact surface 422a and the second contact surface 424a. Thus, the clockwise rotational force and the counterclockwise rotational force are alternately applied to the rotary member 420.

Figure 3:
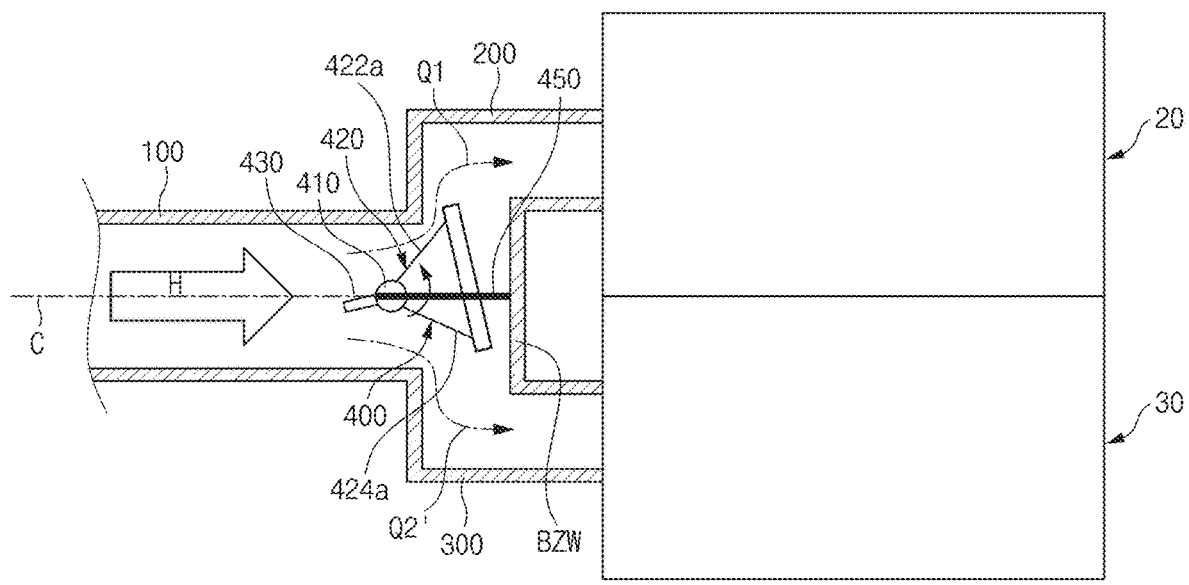
FIGS. 3 and 4 are views for explaining an operational structure of the inlet area change part of the fuel cell system according to an embodiment of the present disclosure.

Referring to FIG. 3, the reactant gas supplied along the first zone Z1 applies the clockwise rotational force (clockwise torque) to the rotary member 420 by coming into contact with the first contact surface 422a, and the reactant gas supplied along the second zone Z2 applies the counterclockwise rotational force (counterclockwise torque) to the rotary member 420 by coming into contact with the second contact surface 424a. When the counterclockwise rotational force becomes higher than the clockwise rotational force, the counterclockwise net torque is applied to the rotary member 420 by a difference between the clockwise rotational force and the counterclockwise rotational force. Thus, the rotary member 420 may rotate counterclockwise.

The second inlet area increases as the rotary member 420 rotates counterclockwise, such that a second supply flow rate Q2' of the reactant gas to be supplied to the second fuel cell stack 30 through the second branch flow path 300 (the second inlet area) may increase (Q2'>Q2). At the same time, the first inlet area decreases as the rotary member 420 rotates counterclockwise, such that a first supply flow rate Q1 of the reactant gas to be supplied to the first fuel cell stack 20 through the first branch flow path 200 (the first inlet area) decreases (Q1<Q1').

Figure 4:
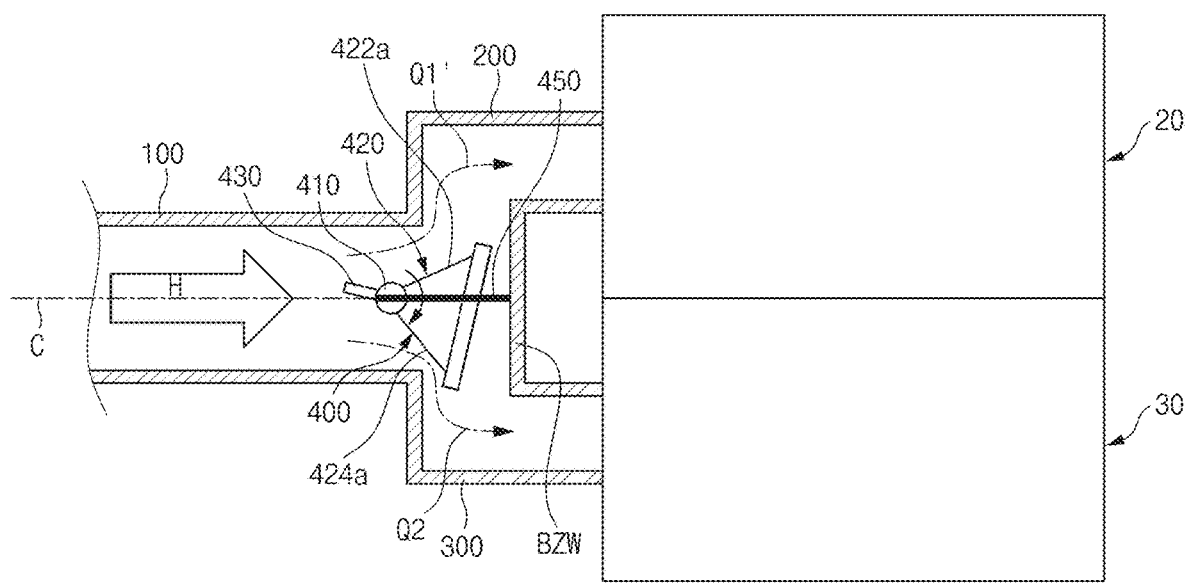

In contrast, referring to FIG. 4, when the rotary member 420 rotates counterclockwise to a predetermined extent or more, the inclination angle of the first contact surface 422a with respect to the centerline C becomes larger than the inclination angle of the second contact surface 424a with respect to the centerline C. Therefore, the clockwise rotational force applied to the first contact surface 422a becomes higher than the counterclockwise rotational force applied to the second contact surface 424a.

Since the clockwise rotational force applied to the rotary member 420 becomes higher than the counterclockwise rotational force applied to the rotary member 420, the clockwise net torque is applied to the rotary member 420 by a difference between the clockwise rotational force and the counterclockwise rotational force. Thus, the rotary member 420 may rotate clockwise.

The first inlet area increases as the rotary member 420 rotates clockwise, such that the first supply flow rate Q1' of the reactant gas supplied to the first fuel cell stack 20 through the first branch flow path 200 (the first inlet area) may increase (Q1'>Q1). At the same time, the second inlet area decreases as the rotary member 420 rotates clockwise, such that the second supply flow rate Q2 of the reactant gas supplied to the second fuel cell stack 30 through the second branch flow path 300 (the second inlet area) decreases (Q2<Q2').

As described above, when the reactant gas is supplied along the supply flow path 100, the opposite rotational forces (the clockwise net torque and the counterclockwise net torque) may be alternately applied to the rotary member 420. Therefore, the rotary member 420 may repeatedly rotate clockwise and counterclockwise (the first and second inlet areas may repeatedly increase and decrease in conjunction with each other).

Figure 5:
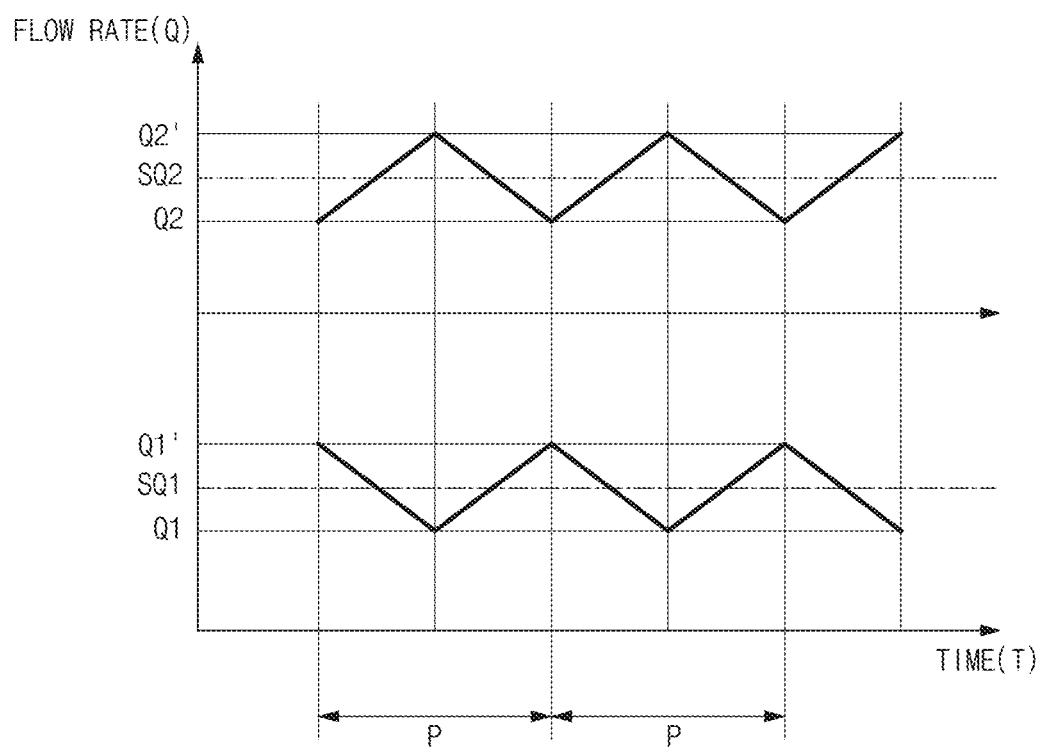
FIG. 5 is a view for explaining a change in flow rate of a reactant gas supplied along a first branch flow path and a second branch flow path in the fuel cell system according to an embodiment of the present disclosure.

Referring to FIG. 5, since the rotary member 420 repeatedly rotates clockwise and counterclockwise, the reactant gas may be supplied to the first fuel cell stack 20 in a flow pattern such as a pulse wave that repeats for the predetermined period P.

Since the reactant gas to be supplied to the first fuel cell stack 20 flows in a flow pattern (pulse wave) in which the maximum supply flow rate Q1' and the minimum supply flow rate Q1 periodically repeat as described above, the periodic impact may be applied to the condensate water produced in the first fuel cell stack 20. Therefore, it is possible to obtain an advantageous effect of more effectively discharging the condensate water produced in the first fuel cell stack 20.

In this case, the maximum supply flow rate Q1' of the reactant gas to be supplied to the first fuel cell stack 20 may be relatively higher than a supply flow rate (a supply flow rate in the related art) SQ1 made when the inlet area change part 400 is excluded. Therefore, it is possible to implement an effect similar to the effect of increasing a stoichiometric ratio (SR) of the reactant gas without a separate blower.

For example, in the case in which the inlet area change part 400 is excluded, the reactant gas supplied to the supply flow path 100 may be divided at a ratio of 5:5 (the first branch flow path:the second branch flow path) and then supplied to the first and second fuel cell stacks 20 and 30 at the predetermined flow rate SQL In contrast, according to the embodiment of the present disclosure, the inlet area change part 400 is provided, such that the reactant gas supplied to the supply flow path 100 may be divided at a ratio of 8:2 (the first branch flow path:the second branch flow path). Therefore, the reactant gas may be supplied to the first fuel cell stack 20 at the flow rate Q1' higher than the flow rate SQ1 in the related art. Therefore, it is possible to implement an effect similar to the effect of increasing the stoichiometric ratio (SR) of the reactant gas to be supplied to the first fuel cell stack 20.

For reference, as the stoichiometric ratio (SR) of the reactant gas to be supplied to the first fuel cell stack 20 increases, the recirculation performance of the reactant gas is improved and the total supply amount of reactant gas increases, which makes it possible to improve the performance in discharging the condensate water.

Likewise, referring to FIG. 5, since the rotary member 420 repeatedly rotates clockwise and counterclockwise, the reactant gas may be supplied to the second fuel cell stack 30 in a flow pattern such as a pulse wave that repeats for the predetermined period P.

Since the reactant gas to be supplied to the second fuel cell stack 30 flows in a flow pattern (pulse wave) in which the maximum supply flow rate Q2' and the minimum supply flow rate Q2 periodically repeat as described above, the periodic impact may be applied to the condensate water produced in the second fuel cell stack 30. Therefore, it is possible to obtain an advantageous effect of more effectively discharging the condensate water produced in the second fuel cell stack 30.

In this case, the maximum supply flow rate Q2' of the reactant gas to be supplied to the second fuel cell stack 30 may be higher than a supply flow rate (a supply flow rate in the related art) SQ2 made when the inlet area change part 400 is excluded. Therefore, it is possible to implement an effect similar to the effect of increasing a stoichiometric ratio (SR) of the reactant gas without a separate blower.

For example, in the case in which the inlet area change part 400 is excluded, the reactant gas supplied to the supply flow path 100 may be divided at a ratio of 5:5 (the first branch flow path: the second branch flow path) and then supplied to the first and second fuel cell stacks 20 and 30 at the predetermined flow rate SQL In contrast, according to an embodiment of the present disclosure, the inlet area change part 400 is provided, such that the reactant gas supplied to the supply flow path 100 may be divided at a ratio of 8:2 (the second branch flow path: the first branch flow path). Therefore, the reactant gas may be supplied to the second fuel cell stack 30 at the flow rate Q2' higher than the flow rate SQ2 in the related art. Therefore, it is possible to implement an effect similar to the effect of increasing the stoichiometric ratio (SR) of the reactant gas to be supplied to the second fuel cell stack 30.

For reference, as the stoichiometric ratio (SR) of the reactant gas to be supplied to the second fuel cell stack 30 increases, the recirculation performance of the reactant gas is improved, and the total supply amount of reactant gas increases, which makes it possible to improve the performance in discharging the condensate water.

Meanwhile, in the embodiment of the present disclosure illustrated and described above, the example has been described in which the first and second inlet areas are simultaneously increased and decreased by the rotary member 420 that rotates about the shaft part 410. However, according to another embodiment of the present disclosure, the first and second inlet areas may be simultaneously increased and decreased by a rectilinearly movable member (e.g., a valve plate) that is disposed in the boundary zone between the first branch flow path and the second branch flow path and rectilinearly moves.

Alternatively, two rectilinearly movable members, which operate independently, may be used to individually increase and decrease the inlet areas of the first and second branch flow paths.

The inlet area change part 400 may have other structures, in addition to the above-mentioned structure, in accordance with required conditions and design specifications.

FIGS. 6-22 are views for explaining modified examples of the inlet area change part of the fuel cell system according to embodiments of the present disclosure. Further, the parts identical and equivalent to the parts in the above-mentioned configuration are designated by the identical or equivalent reference numerals, and detailed descriptions thereof have been omitted.

Figure 2:
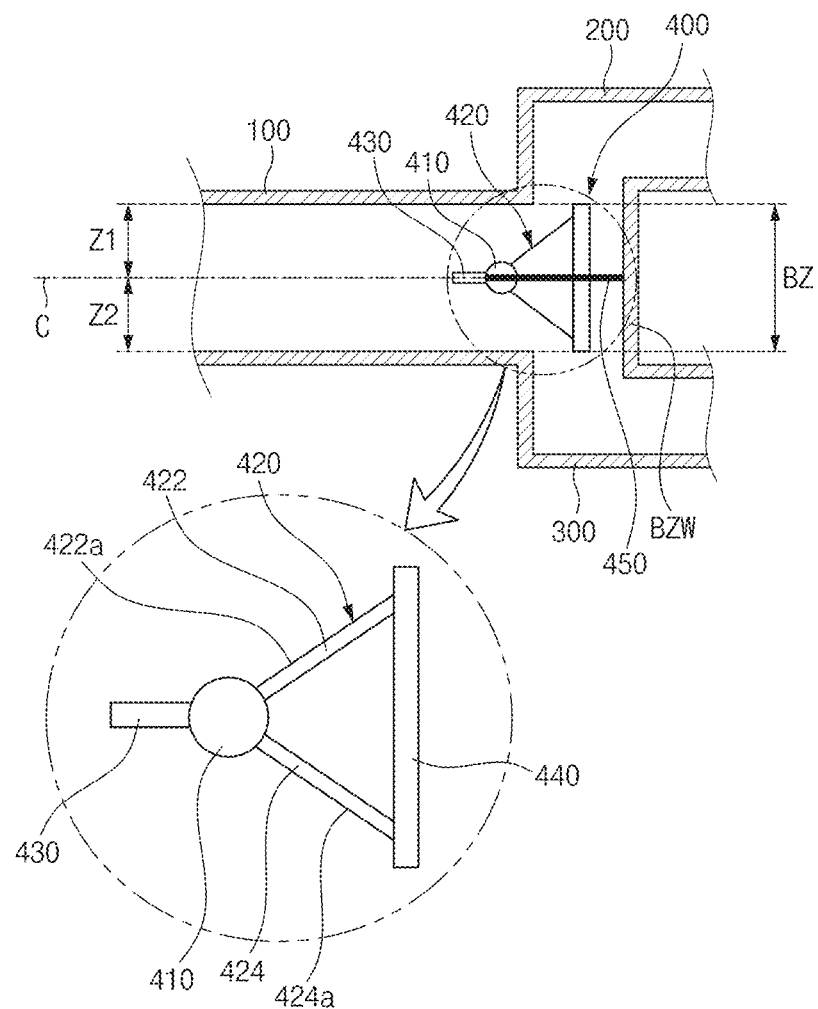
FIG. 2 is a view for explaining an inlet area change part of the fuel cell system according to an embodiment of the present disclosure.
Figure 6:
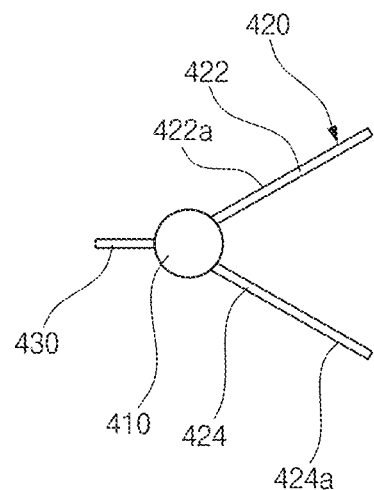
FIGS. 6-22 are views for explaining modified examples of the inlet area change part of the fuel cell system according to embodiments of the present disclosure.

Referring to FIG. 6, according to an embodiment of the present disclosure, the inlet area change part 400 may include the shaft part 410, the rotary member 420, and the counterweight 430 to define an approximately "V" shape without a separate connection member 440 (see FIG. 2).

Since the inlet area change part 400 excludes the connection member 440 as described above, the weight of the rotary member 420 may be reduced, and the structure of the rotary member 420 may be simplified. In addition, to implement the rotational equilibrium based on the shaft part 410, a sum of moment of force of the first blade part 422, the second blade part 424, and the connection member 440 needs to be equal to the moment of force of the counterweight 430. Therefore, the absence of the connection member 440 may reduce the length of the counterweight 430, which makes it possible to improve the performance of the inlet area change part 400. The reason is that the increase in length of the counterweight 430 may cause the counterweight 430 to cover the first and second inlet areas, reduce the restoring force applied to the rotary member 420, and hinder the smooth rotation and vibration of the rotary member 420.

Figure 7:
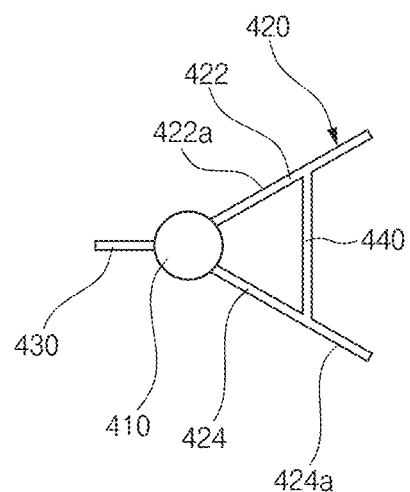

Referring to FIG. 7, according to an embodiment of the present disclosure, the inlet area change part 400 may include the shaft part 410, the rotary member 420, the counterweight 430, and the connection member 440 to define an approximately "A" shape.

In other words, one end of the connection member 440 may be connected to the first blade part 422 and the other end of the connection member 440 may be connected to the second blade part 424. One end and the other end of the connection member 440 may be connected to be spaced apart from outermost peripheral ends of the first and second blade parts 422 and 424.

Such application of the connection member 440 may prevent the deformation of the first and second blade parts 422 and 424. In addition, since one end and the other end of the connection member 440 are connected to be spaced apart from the outermost peripheral ends of the first and second blade parts 422 and 424, a sum of moment of force of the first blade part 422, the second blade part 424, and the connection member 440 decreases in comparison with a case in which one end and the other end of the connection member 440 are connected to the outermost peripheral ends thereof (see FIG. 2). Therefore, it is possible to reduce the size of the counterweight 430 and improve the performance of the rotary member 420.

Figure 8:
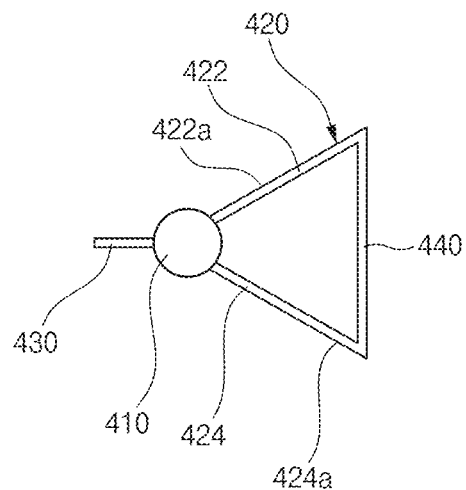

Referring to FIG. 8, according to an embodiment of the present disclosure, the inlet area change part 400 may include the shaft part 410, the rotary member 420, the counterweight 430, and the connection member 440 to define an approximately triangular shape.

In other words, one end of the connection member 440 may be connected to the first blade part 422 and the other end of the connection member 440 may be connected to the second blade part 424. One end and the other end of the connection member 440 may be connected to the outermost peripheral ends of the first and second blade parts 422 and 424.

Since one end and the other end of the connection member 440 are connected to the outermost peripheral ends of the first and second blade parts 422 and 424 as described above, it is possible to obtain an advantageous effect of maximizing structural stability of the inlet area change part 400.

Figure 9:
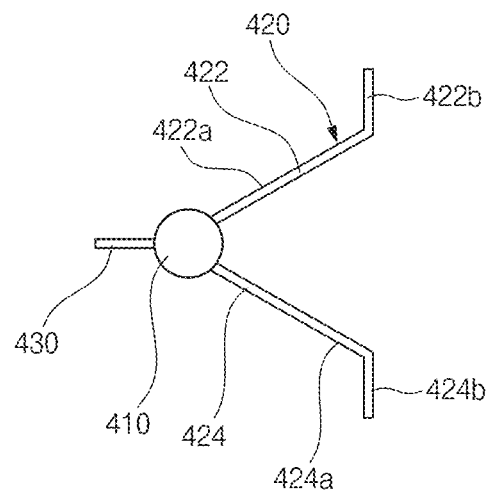

Referring to FIG. 9, according to an embodiment of the present disclosure, the inlet area change part 400 may include the shaft part 410, the rotary member 420, and the counterweight 430. A first extension portion 422b may be bent and extend from an end of the first blade part 422 and a second extension portion 424b may be bent and extend from an end of the second blade part 424.

For example, the first and second extension portions 422b and 424b may each have a straight shape. Alternatively, the first and second extension portions 422b and 424b may each have a curved shape or other shapes.

Since the first and second extension portions 422b and 424b are provided as described above, it is possible to ensure a sufficient contact area with which the reactant gas comes into contact. Therefore, it is possible to obtain an advantageous effect of further increasing the rotational forces (the clockwise rotational force and the counterclockwise rotational force) applied to the rotary member 420.

Figure 10:
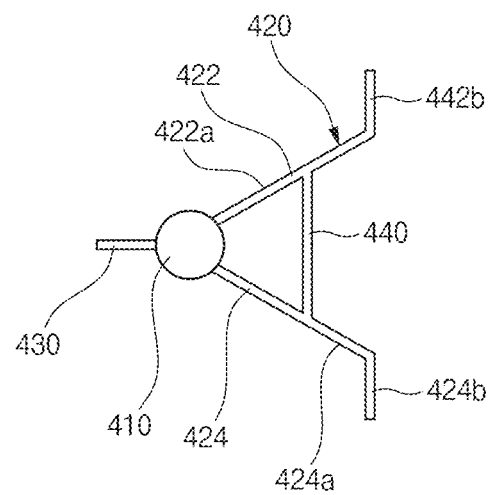

Referring to FIG. 10, according to an embodiment of the present disclosure, the inlet area change part 400 may include the shaft part 410, the rotary member 420, the counterweight 430, and the connection member 440 to define an approximately "A" shape. The first extension portion 422b may be bent and extend from the end of the first blade part 422 and the second extension portion 424b may be bent and extend from the end of the second blade part 424.

For example, the first and second extension portions 422b and 424b may each have a straight shape. Alternatively, the first and second extension portions 422b and 424b may each have a curved shape or other shapes.

Figure 11:
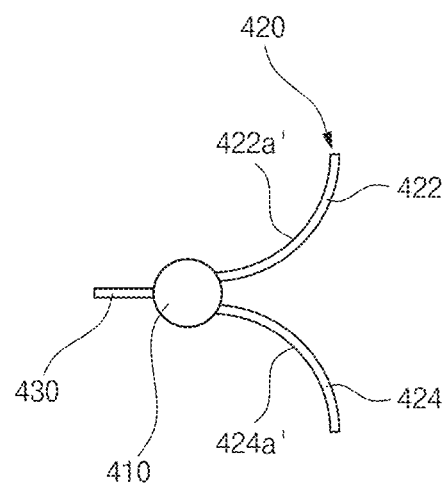
Figure 12:
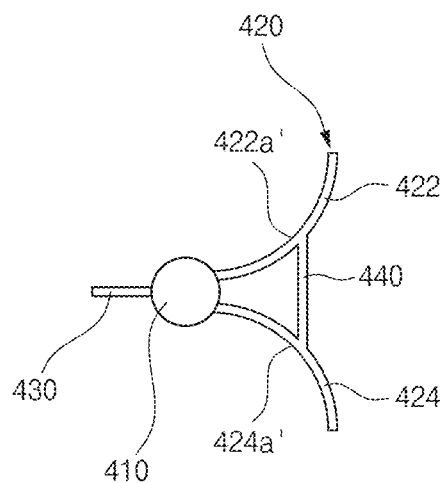
Figure 13:
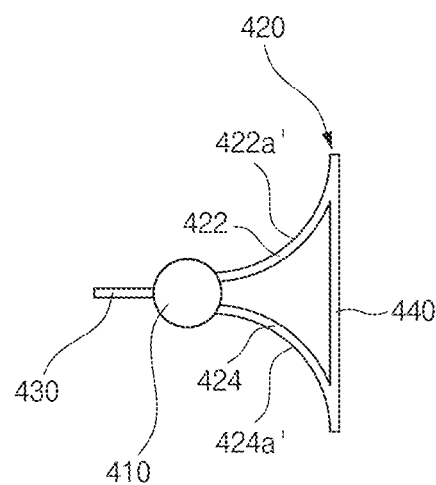
Figure 14:
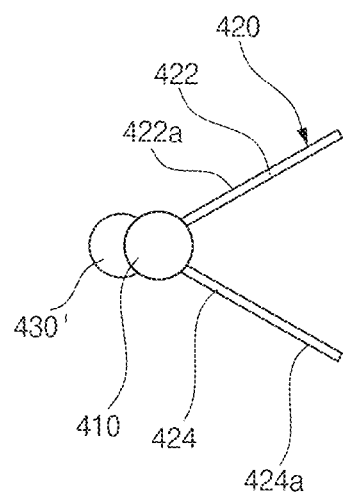
Figure 15:
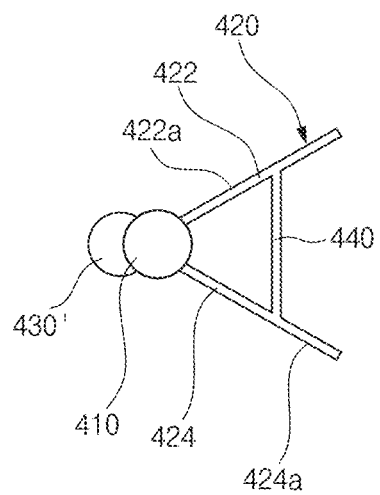
Figure 16:
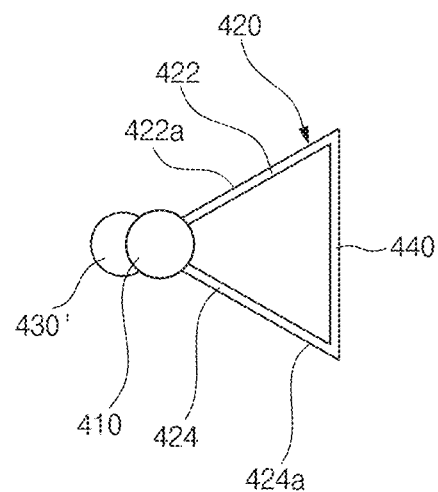
Figure 17:
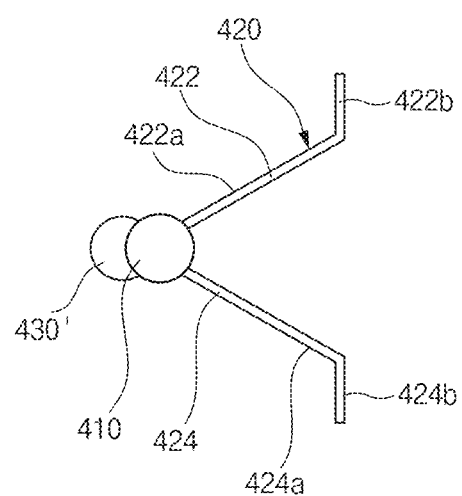
Figure 18:
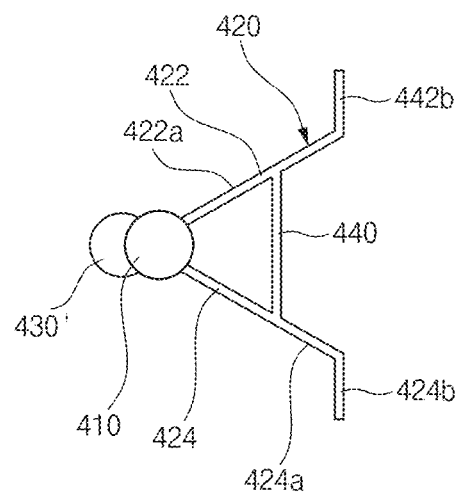
Figure 19:
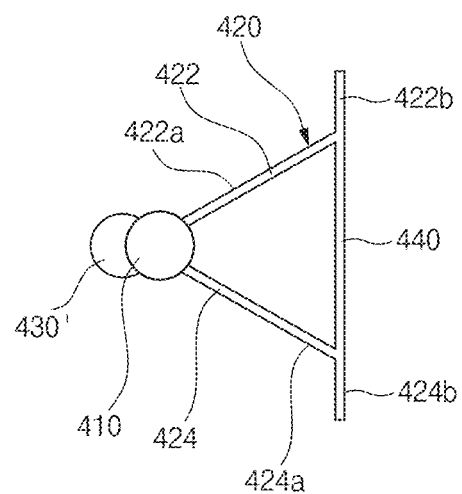
Figure 20:
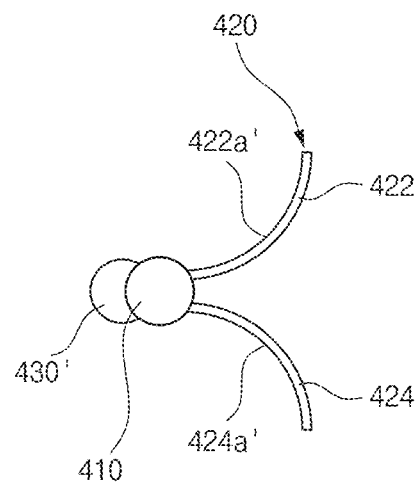
Figure 21:
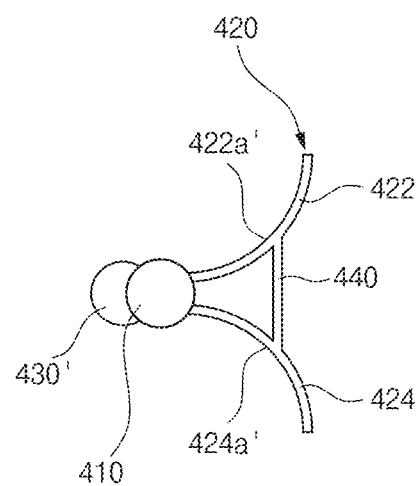
Figure 22:
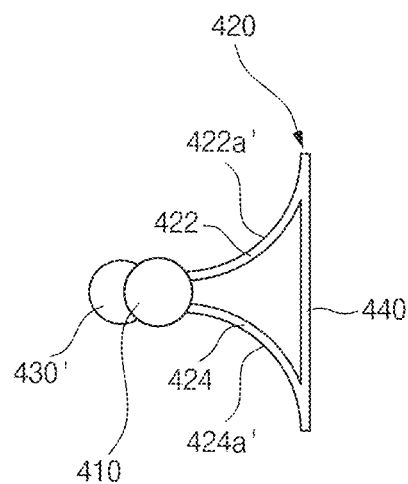

Referring to FIGS. 11-13, according to an embodiment of the present disclosure, the inlet area change part 400 may include the shaft part 410, the rotary member 420, and the counterweight 430. A first contact surface 422a' of the first blade part 422 and a second contact surface 424a' of the second blade part 424 may each have a curved shape (e.g., a circular arc shape).

In addition, as illustrated in FIGS. 12 and 13, the first blade part 422 and the second blade part 424 may be connected by means of the connection member 440 even in the structure in which the first contact surface 422a' of the first blade part 422 and the second contact surface 424a' of the second blade part 424 each have a curved shape.

Since the first contact surface 422a' of the first blade part 422 and the second contact surface 424a' of the second blade part 424 each have a curved shape (e.g., a circular arc shape) as described above, it is possible to ensure a maximum contact area with which the reactant gas comes into contact. Therefore, it is possible to obtain an advantageous effect of further increasing the rotational forces (the clockwise rotational force and the counterclockwise rotational force) applied to the rotary member 420.

In addition, in an embodiment of the present disclosure illustrated and described above, an example has been described in which the counterweight 430 is provided in the form of a rectilinear quadrangular block. However, according to another embodiment of the present disclosure, the counterweight 430 may have a spherical shape.

Referring to FIGS. 14-22, according to an embodiment of the present disclosure, the inlet area change part 400 may include the shaft part 410, the rotary member 420, and a counterweight 430', and the counterweight 430' may have an approximately spherical shape.

Since the counterweight 430' has a spherical shape as described above, it is possible to obtain an advantageous effect of minimizing rotational interference caused by the counterweight 430' (interference that hinders net torque).

Referring to FIG. 23, according to an embodiment of the present disclosure, the inlet area change part 400 may include the shaft part 410, the rotary member 420, and the counterweight 430. The counterweight 430 may be partially provided in a partial section in an axial direction of the shaft part 410.

Since the counterweight 430 is partially provided in the partial section in the axial direction of the shaft part 410 as described above, it is possible to obtain an advantageous effect of minimizing rotational interference caused by the counterweight 430 (interference that hinders net torque).

Alternatively, as illustrated in FIG. 24, the counterweight 430 may be continuously provided in an entire section in the axial direction of the shaft part 410.

Figure 25:
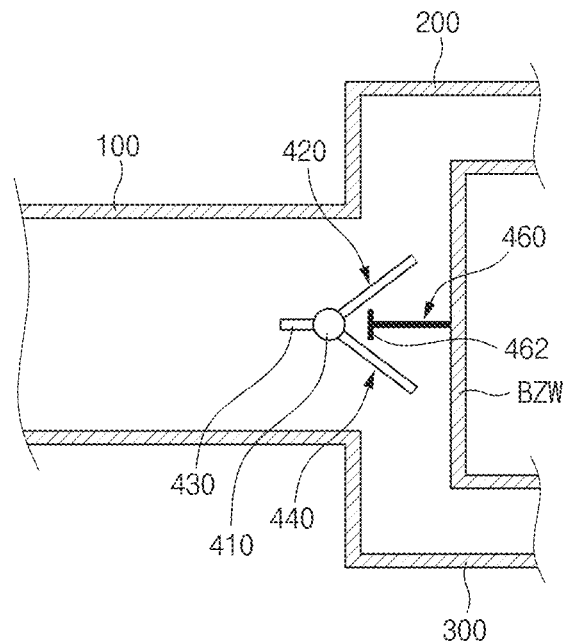
FIGS. 25 and 26 are views for explaining a stopper part of the fuel cell system according to an embodiment of the present disclosure.
Figure 26:
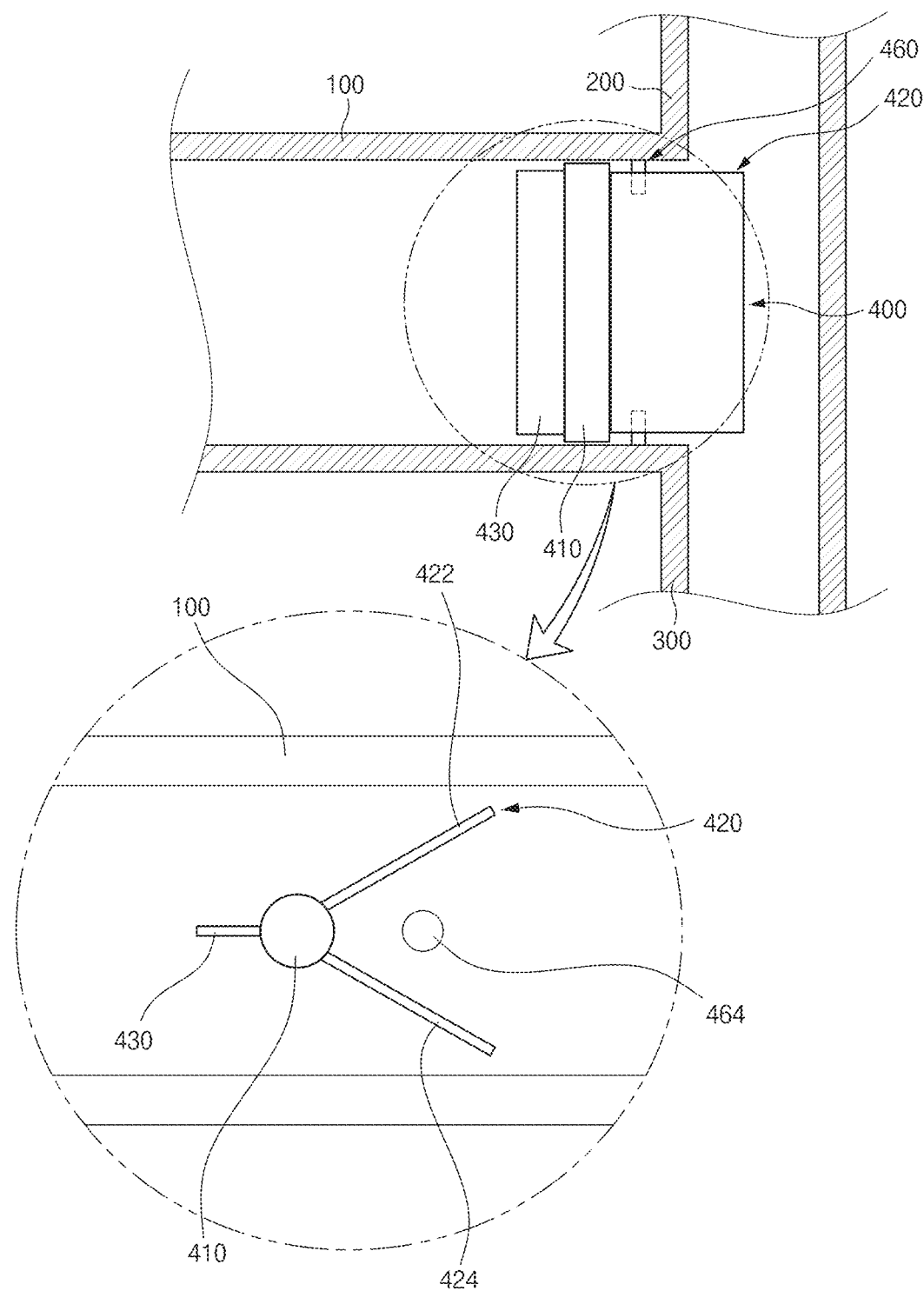

Referring to FIGS. 25 and 26, according to an embodiment of the present disclosure, the fuel cell system 10 may include a stopper part 460 configured to restrict a rotation section of the rotary member 420.

The stopper part 460 may have various structures capable of restricting the rotation section of the rotary member 420. The present disclosure is not restricted or limited by the structure of the stopper part 460.

For example, referring to FIG. 25, the stopper part 460 may include a first stopper member 462 disposed between the first blade part 422 and the second blade part 424 and provided on the boundary wall BZW that defines the wall surface of the boundary zone BZ between the first branch flow path 200 and the second branch flow path 300.

The first stopper member 462 may have various structures capable of coming into contact with an inner surface of the first blade part 422 or the second blade part 424. The present disclosure is not restricted or limited by the structure of the first stopper member 462.

As described above, the first stopper member 462 is provided between the first blade part 422 and the second blade part 424. Also, the first stopper member 462 is restricted by the inner surface of the first blade part 422 or the second blade part 424 when the rotary member 420 rotates to a predetermined extent or more (clockwise and counterclockwise). Therefore, it is possible to prevent the rotary member 420 from excessively rotating and to inhibit the reciprocating rotation period P of the rotary member 420 from increasing to a predetermined extent or more.

As another example, referring to FIG. 26, the stopper part 460 may include a second stopper member 464 disposed between the first blade part 422 and the second blade part 424 and provided on the wall surface of the supply flow path 100.

The second stopper member 464 may have various structures capable of coming into contact with the inner surface of the first blade part 422 or the second blade part 424. The present disclosure is not restricted or limited by the structure of the second stopper member 464.

While some embodiments have been described above, the embodiments are just illustrative and are not intended to limit the present disclosure. It should be appreciated by those having ordinary skill in the art that various modifications and applications, which are not described above, may be made to the present embodiments without departing from the intrinsic features of the present embodiments. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell system comprising:
a supply flow path configured to supply reactant gas;
a first branch flow path branching off from an outlet end of the supply flow path and configured to guide the reactant gas to a first fuel cell stack;
a second branch flow path branching off from the outlet end of the supply flow path and configured to communicate with the first branch flow path and guide the reactant gas to a second fuel cell stack; and
an inlet area change part disposed in a boundary zone between the first branch flow path and the second branch flow path and configured to selectively change inlet areas of the first and second branch flow paths,
wherein the inlet area change part includes
a shaft part rotatably disposed on a centerline defined in the boundary zone,
a rotary member disposed to be rotatable about the shaft part and including a first blade part connected to the shaft part and having a first contact surface that comes into contact with the reactant gas in a first zone defined based on the centerline, and including a second blade part connected to the shaft part and having a second contact surface that comes into contact with the reactant gas in a second zone based on the centerline, and a counterweight disposed on the shaft part and configured to apply a load to the rotary member so that the rotary member moves to a position at which the first blade part and the second blade part are balanced based on the centerline.

2. The fuel cell system of claim 1, wherein the inlet area change part selectively increases and decreases a first inlet area of the first branch flow path and a second inlet area of the second branch flow path, wherein a first supply flow rate of the reactant gas to be supplied to the first branch flow path is changed as the first inlet area increases or decreases, and wherein a second supply flow rate of the reactant gas to be supplied to the second branch flow path is changed as the second inlet area of the second branch flow path increases or decreases.

3. The fuel cell system of claim 2, wherein the inlet area change part is configured such that the first inlet area and the second inlet area are increased and decreased in conjunction with each other, wherein the second inlet area decreases as the first inlet area increases, and wherein the second inlet area increases as the first inlet area decreases.

4. The fuel cell system of claim 1, wherein the first and second contact surfaces each have any one of a straight shape, a curved shape, and a combination of the straight shape and the curved shape.

5. The fuel cell system of claim 1, wherein the first and second contact surfaces are symmetric with respect to the centerline.

6. The fuel cell system of claim 1, further comprising:
a first extension portion bent and extending from an end of the first blade part; and
a second extension portion bent and extending from an end of the second blade part.

7. The fuel cell system of claim 1, further comprising:
a connection member having one end connected to the first blade part and the other end connected to the second blade part.

8. The fuel cell system of claim 7, wherein one end and the other end of the connection member are connected to outermost peripheral ends of the first and second blade parts.

9. The fuel cell system of claim 7, wherein one end and the other end of the connection member are connected to be spaced apart from outermost peripheral ends of the first and second blade parts.

10. The fuel cell system of claim 1, wherein the counterweight is partially provided in a partial section in an axial direction of the shaft part.

11. The fuel cell system of claim 1, wherein the counterweight is continuously provided in an entire section in an axial direction of the shaft part.

12. The fuel cell system of claim 1, further comprising:
a sliding coupling part disposed on the shaft part and configured to allow the counterweight to be slidably coupled thereto.

13. The fuel cell system of claim 1, further comprising:
a mount part disposed on a boundary wall that defines a wall surface of the boundary zone,
wherein the shaft part is rotatably supported on the mount part.

14. The fuel cell system of claim 1, further comprising:
a stopper part configured to restrict a rotation section of the rotary member.

15. The fuel cell system of claim 14, wherein the stopper part comprises a first stopper member disposed between the first blade part and the second blade part and provided on a boundary wall that defines a wall surface of the boundary zone.

16. The fuel cell system of claim 14, wherein the stopper part comprises a second stopper member disposed between the first blade part and the second blade part and provided on a wall surface of the supply flow path.

* * * * *